United States Patent
Fritz et al.

(10) Patent No.: US 10,015,927 B2
(45) Date of Patent: Jul. 10, 2018

(54) ENERGY MANAGEMENT SYSTEM FOR AN AGRICULTURAL VEHICLE ARRANGEMENT

(71) Applicant: Deere & Company, Moline, IL (US)

(72) Inventors: Norbert Fritz, Ilvesheim (DE); Rainer Gugel, Plankstadt (DE); Philipp Muench, Kaiserslautern (DE); Barbara Boehm, Heidelberg (DE); John W. Regenauer, Denver, IA (US)

(73) Assignee: Deere & Company, Moline, IL (US)

( * ) Notice: Subject to any disclaimer, the term of this patent is extended or adjusted under 35 U.S.C. 154(b) by 98 days.

(21) Appl. No.: 15/134,894

(22) Filed: Apr. 21, 2016

(65) Prior Publication Data
US 2016/0316621 A1    Nov. 3, 2016

(30) Foreign Application Priority Data
Apr. 29, 2015   (DE) .......................... 10 2015 207 965

(51) Int. Cl.
  *H02M 3/06*   (2006.01)
  *A01D 41/12*  (2006.01)
  (Continued)

(52) U.S. Cl.
  CPC .............. *A01D 41/12* (2013.01); *B60L 1/00* (2013.01); *B60L 1/003* (2013.01); *H02J 1/14* (2013.01); *B60L 2200/40* (2013.01)

(58) Field of Classification Search
  None
  See application file for complete search history.

(56) References Cited

U.S. PATENT DOCUMENTS 5,270,578 A * 12/1993 Yamamura ................ H02J 1/10
                                                              307/34
5,416,702 A *  5/1995 Kitagawa ................ B60L 1/003
                                                            180/65.31
(Continued)

FOREIGN PATENT DOCUMENTS

CN    101878573 A    11/2010
CN    101883702 A    11/2010
(Continued)

OTHER PUBLICATIONS

EP Search Report issued in counterpart application No. EP16167022.9, dated Sep. 30, 2016 (9 pages).
(Continued)

*Primary Examiner* — Lincoln Donovan
*Assistant Examiner* — Khareem E Almo

(57) ABSTRACT

An energy management system for an agricultural vehicle arrangement includes an electric power supply unit for the supply of a large number of electrical consumers with electric power, and a consumption monitoring unit for the determination of a total energy demand dependent on an actual operating state of the electrical consumers. The consumption monitoring unit undertakes an estimate of the electric power supply available from the electric power supply unit and compares it to the determined total electric power demand in order to reduce the electric power supply to the electrical consumers as a function of assigned supply priorities when the available electric power supply is exceeded by the determined total energy demand. The consumption monitoring unit undertakes a dynamic adaptation of the supply priorities as a function of a changing cooling demand of a vehicle unit that is cooled by means of at least one of the electrical consumers.

14 Claims, 1 Drawing Sheet

(51) Int. Cl.
*B60L 1/00* (2006.01)
*H02J 1/14* (2006.01)

(56) References Cited

U.S. PATENT DOCUMENTS

| | | | | |
|---|---|---|---|---|
| 5,845,221 | A * | 12/1998 | Hosokawa | B60R 16/0315 307/10.1 |
| 6,301,528 | B1 | 10/2001 | Bertram et al. | |
| 6,427,107 | B1 * | 7/2002 | Chiu | E02F 9/2029 172/2 |
| 6,472,772 | B2 * | 10/2002 | Onizuka | B60R 16/0238 307/10.1 |
| 6,700,386 | B2 * | 3/2004 | Egami | B60Q 11/00 307/10.1 |
| 6,986,398 | B2 * | 1/2006 | Obayashi | H02J 1/14 180/167 |
| 7,146,263 | B2 * | 12/2006 | Guven | B60K 6/46 477/110 |
| 7,615,879 | B2 | 11/2009 | Przywecki | |
| 7,795,752 | B2 * | 9/2010 | Gorman | H02J 1/14 307/9.1 |
| 8,010,250 | B2 * | 8/2011 | Borumand | H02J 1/14 700/295 |
| 8,793,002 | B2 | 7/2014 | Anderson et al. | |
| 8,964,828 | B2 * | 2/2015 | Raveendran | H04N 21/4348 375/240 |
| 2004/0124703 | A1 * | 7/2004 | Tani | B60R 16/0315 307/10.1 |
| 2005/0057208 | A1 * | 3/2005 | Seibel | H02P 21/10 318/432 |
| 2005/0171669 | A1 * | 8/2005 | Sato | B60W 30/188 701/51 |
| 2007/0005205 | A1 * | 1/2007 | Bernardi | B60L 1/003 701/36 |
| 2007/0141999 | A1 * | 6/2007 | Przywecki | B60R 16/03 455/82 |
| 2009/0014057 | A1 | 1/2009 | Croft et al. | |
| 2011/0010182 | A1 * | 1/2011 | Turski | G06Q 10/107 705/1.1 |
| 2012/0181095 | A1 | 7/2012 | Lopez | |
| 2014/0297062 | A1 | 10/2014 | Anderson et al. | |
| 2017/0308969 | A1 * | 10/2017 | Forbes, Jr. | G05D 17/00 |

FOREIGN PATENT DOCUMENTS

| | | |
|---|---|---|
| DE | 19857916 A1 | 6/2000 |
| DE | 10347684 A1 | 5/2004 |
| DE | 102005060129 A1 | 6/2007 |
| DE | 112008003179 T5 | 1/2011 |
| DE | 112008003182 T5 | 1/2011 |
| EP | 1053129 B1 | 2/2005 |
| EP | 2293405 A1 | 3/2011 |
| EP | 2551140 A1 | 1/2013 |
| JP | 2004242558 A | 9/2004 |
| WO | 2009070296 A1 | 6/2009 |
| WO | 2009073128 A3 | 7/2009 |

OTHER PUBLICATIONS

Search Report issued in counterpart application No. DE102015207965.1, dated Nov. 18, 2015 (12 pages).

* cited by examiner

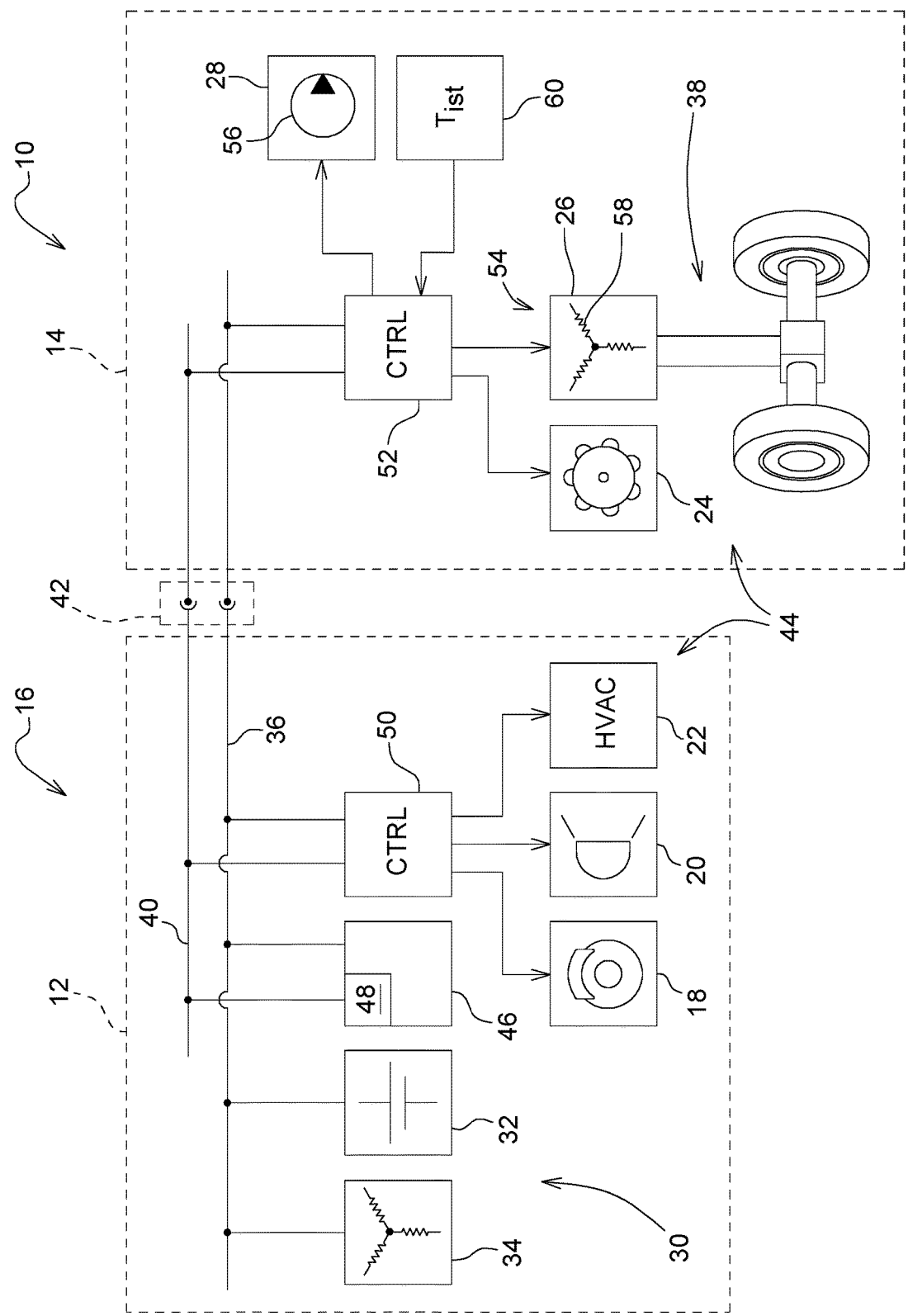

ENERGY MANAGEMENT SYSTEM FOR AN AGRICULTURAL VEHICLE ARRANGEMENT

RELATED APPLICATION

This application claims the benefit of German Application Ser. No. 102015207965.1, filed on Apr. 29, 2015, which is hereby expressly incorporated by reference in its entirety.

FIELD OF THE DISCLOSURE

The present disclosure relates to an energy management system for an agricultural vehicle arrangement, and in particular, to a system with an electric power supply unit for providing a large number of electrical consumers with electric power and a consumer monitoring unit to determine a total electric power demand that is dependent on a real operating state of the electrical consumers.

BACKGROUND

A conventional system in the form of a device for the control of electrical consumers of diverse vehicle components or vehicle functions is disclosed in German Application 198 57 916 A1. Each of the electrical consumers requests electric power with a corresponding consumption coordinator. The consumption coordinator assigns individual priority stages to the electrical consumers. A vehicle coordinator compares the power requirements to a power availability potential of a vehicle power network. Depending on the comparison result, the vehicle coordinator issues orders for the power delivery to the consumption coordinator. If the power requests exceed the power availability potential of the vehicle power network and thus the available power, then it is distributed to the electrical consumers of the highest priority stage. Electrical consumers with a low priority stage are accordingly allocated no power, or only a reduced amount.

The priority stages change dynamically with the operating state of the electrical consumer. Thus, an electrical consumer operated with a reduced power changes to a higher priority stage as soon as a function change, caused as a result of the power-reduced operation, for example, as a result of a limited air conditioning or venting of a vehicle interior, becomes noticeably disadvantageous for a user.

A more extensive consideration of possibly occurring impairments of the vehicle units associated with the electrical consumers operated with a reduced power does not take place.

SUMMARY

The present disclosures provides a means for refining an energy management system with regard to an increased operational reliability of vehicle units associated with electrical consumers.

The energy management system for an agricultural vehicle arrangement includes an electric power supply unit for the supply of a large number of electrical consumers with electric power, and a consumption monitoring unit for the determination of a total electric power demand dependent on an actual operating state of the electrical consumers. The consumption monitoring unit undertakes an estimate of the electric power supply available to the electric power supply unit in order to reduce the supply of the electrical consumers with electric power as a function of assigned supply priorities when the available electric power supply is exceeded by the total determined energy demand. In accordance with this disclosure, the consumption monitoring unit undertakes a dynamic adaptation of the consumption priorities as a function of a changing cooling requirement of a vehicle unit that is cooled by means of at least one of the electrical consumers.

This disclosure also takes into consideration the fact that the operating reliability of most vehicle units decisively depends on sufficient cooling, wherein this increasingly takes place by means of electrically operated cooling circuits, fans, or the like. An insufficient cooling is often not noticed by the user until the irreversible breakdown of the pertinent vehicle unit. The operating reliability can therefore be decisively increased by consideration of the changing cooling demand of such vehicle units.

In the simplest case, the determination of the cooling demand is carried out by means of traditional temperature sensors, wherein corresponding actual temperature values are derived from the sensor signals made available by the temperature sensors. The actual temperature values can be compared with various escalation stages of an increasing cooling deficit of the vehicle unit, corresponding to several predefined temperature threshold values. The priority of the electrical consumer provided for its cooling is increased step by step when the temperature threshold values are exceeded. In this way, there is a guarantee that the electric power demand of the electrical consumer that is required for sufficient cooling of the vehicle unit is at least substantially covered. In order to maintain the electric power supply that is available, as a whole, the consumption monitoring unit simultaneously undertakes a reduction of the total electric power demand by a ranking of the supply priorities of one or more of the other electrical consumers.

The vehicle arrangement can be a vehicle combination consisting of an agricultural tractor and an agricultural attached device, wherein the electrical consumers comprised by the energy management system can be assigned to the agricultural tractor. The agricultural attached device can be used for the carrying out of diverse agricultural work functions or the preparation of power units. In the case of an automated attached device operation, the control of the pertinent electrical consumers can take place on the basis of an ISOBUS class 3 protocol. A distributed control device architecture can be provided in which the agricultural work functions are controlled in an automated manner by the agricultural attached device, but a drive comprised by it is controlled by the agricultural tractor. In addition, there can be other electrical consumers that are assigned to the other various functions of the vehicle combination.

Typically, the electrical consumers are subdivided into several consumer groups of the same supply priority.

For the case of the described vehicle combination under consideration, the following categories can be provided, wherein each is provided as a non-limiting example:

Supply Priority 1—Core Vehicle Functions

Safety-relevant vehicle functions which are used for the maintenance of braking, steering, and gear functions of the agricultural tractor or attached device, including those which concern electrically activated coupling, service brake, or parking brake equipment.

Supply Priority 2—Agricultural Work Functions

Electrical consumers for the carrying out of agricultural work functions, in particular electrically operated rotary rakes, disk drives, sowing elements, seed blowers, and electrical illumination devices for work environment illumination. These functions have a comparatively high priority since the maintenance of a constant productivity or processing rate of agricultural work functions is of particular importance for commercial users.

Supply Priority 3—Power Units

Electrical wheel drives of the agricultural attached device, in particular, wheel-individual or axially provided electric drive motors. In the case of a reduction of the power rate of the vehicle combination, there may be a corresponding adaptation of the processing rate of simultaneously carried out agricultural work functions.

Supply Priority 4—Comfort Functions

Electrically operated vehicle units for the cabin air conditioning of the agricultural tractor, maintenance electronics system, or interior electrical illumination.

Supply Priority 5—Auxiliary Functions

Electrical consumers for the cooling of vehicle units, including electrically operated fans and cooling circuits, heating and cooling units for crop conditioning.

As a result of the comparatively inert temperature behavior of most cooled vehicle units, the supply of electric power to the electrical consumer intended for cooling of the fifth supply priority can be limited in favor of higher prioritized functions. In this respect, the assigned auxiliary functions basically have the lowest supply priority provided that the operating reliability of the pertinent vehicle units is not impaired due to the reduced cooling. Otherwise, to avoid heat damage, there is a step-wise raising of the supply priority in the manner described herein.

It is also noted that instead of a vehicle combination consisting of an agricultural tractor or attached device, there can also be a different agricultural vehicle arrangement such as, for example, a harvesting machine, a field chopper, a self-propelled spraying device, or the like.

The consumption monitoring unit proportionally reduces the supply of electric power for all electrical consumers of a specific supply priority to its electrical rated output, i.e., to its maximum output permissible for continuous operation. In relation to one another, the reduction of the electrical supply takes place to the same extent for each of the electrical consumers of a specific supply priority, and thereby avoiding any undesirable impact to individual electrical consumers.

In the simplest case, the consumption monitoring unit can interrupt the supply of electric power for all electrical consumers of a specific supply priority. This takes place by turning off the pertinent electrical consumer, for example, in that the consumption monitoring unit sends via an ISOBUS interface, i.e., a turn-off command to a control unit correlated with the electrical consumer.

Moreover, there is the possibility that a reduction of the supply of electric power, in particular, in the case of electrical consumers with the highest supply priority, is avoided. Among these are electrical consumers that are assigned safety-relevant core vehicle functions and whose operation must be maintained under all circumstances.

In order to keep a possible impairment of the functions carried out by the electrical consumers as low as possible, it is conceivable that a reduction of the supply of electric power takes place only if and as long as this is actually required for the maintenance of the available electric power supply.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

The FIGURE illustrates an embodiment of the inventive energy management system for an agricultural vehicle arrangement.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

The present disclosure relates to an energy management system for an agricultural vehicle arrangement, and in particular, to a system with an electric power supply unit for providing a large number of electrical consumers with electric power and a consumer monitoring unit to determine a total electric power demand that is dependent on a real operating state of the electrical consumers, wherein the consumer monitoring unit undertakes an estimate of the electric power supply available to the electric power supply unit and compares it to the total determined energy demand in order to reduce the supply of the electrical consumers with electric power as a function of correlated supply priorities when the available electric power supply is exceeded by the total determined energy demand The agricultural vehicle arrangement 10, which is shown schematically in the accompanying FIGURE, may be a vehicle combination 16 including an agricultural tractor 12 and an agricultural attached device 14 coupled thereto. Both the agricultural tractor 12 and the agricultural attached device 14, which may be an electrically driven hay loader wagon, have diverse electrical consumers 18, 20, 22, 24, 26, 28 which are supplied with electric power from a power supply unit 30 of the agricultural tractor 12. Stated more precisely, the electric power is supplied from a direct current vehicle power network 36 via a vehicle battery 32 or a generator 34.

In this embodiment, the vehicle combination 16 for carrying out an automatic attached device operation is designed so that at least some of the electrical consumers 18, 20, 22, 24, 26, 28 are used to carry out agricultural work functions of the agricultural attached device 14 or for the preparation of an electrical drive 38 comprised by this. The control of the pertinent electrical consumers is carried out on the basis of an ISOBUS class 3 protocol. A distributed control device architecture, cross-linked via an ISOBUS data network 40, is provided in which the agricultural work functions are controlled in an automated manner by the agricultural attached device 14. The electrical drive 38, however, is controlled by the agricultural tractor 12. The ISOBUS data network 40 and the direct current power supply network 36 are accordingly distributed in partial sections, wherein the two partial sections communicate with one another via a standardized ISOBUS plug connection 42.

The electrical consumers 18, 20, 22, 24, 26, 28 are subdivided into several consumer groups of the same supply priority, wherein for the vehicle combination 16 herein described, the following categories are provided:

Supply Priority 1—Vehicle Core Functions

Safety-relevant vehicle functions which are used for the maintenance of braking, steering, and gear functions of the agricultural tractor 12 or of the agricultural attached device 14, including those that concern electrically activated coupling, service brake, or parking brake devices. They are represented, in this embodiment, by the electrical consumers 18.

Supply Priority 2—Agricultural Work Functions

Electrical consumers for carrying out agricultural work functions such as an electrical drive for the holding of crops to be loaded, and also electrical illumination devices for the work environment illumination. In this embodiment, they are represented by the two electrical consumers 20, 24.

Supply Priority 3—Drives

Electrical drives of the agricultural attached device 14, in particular, individual-wheel or axially provided electric drive motors. They are represented by the electrical consumer 26. In the case of a reduction of the traveling speed there may be a corresponding adaptation of the processing rate of simultaneously carried-out agricultural work functions of the second supply priority.

Supply Priority 4—Comfort Functions

Electrically operated components for the cabin air conditioning of the agricultural tractor 12, maintenance electronics system, and electrical interior illumination. These are represented in the illustrated embodiment by the consumer 22.

Supply Priority 5—Auxiliary Functions

Electrical consumers for the cooling of vehicle units, including electrically operated fans and cooling circuits. These are represented in the this embodiment by the electrical consumer 28.

The energy management system 44 located in the agricultural vehicle arrangement 10 includes a consumer monitoring unit 46 for the determination of a total electric power demand depending on an actual operating state of the electrical consumers 18, 20, 22, 24, 26, 28. The actual operating state is deduced from the individually corresponding control commands that the consumer monitoring unit 46 receives via an internal ISOBUS interface 48 on the ISOBUS data network 40. The consumer monitoring unit 46 undertakes an estimate of the electric power supply available to the electric power supply unit 30 and compares it to the determined total electric power demand. If the consumption monitoring unit 46 detects that the total determined energy demand exceeds the available electric power supply, then it reduces the electric power supply to the electrical consumers 20, 22, 24, 26, 28 as a function of the individual assigned supply priorities beginning with the consumer group with the lowest supply priority.

The consumption monitoring unit 46 proportionally reduces the supply of electric power to all electrical consumers 20, 22, 24, 26, 28 of a specific supply priority to their electrical rated output, i.e., to their maximum output permissible for continuous operation. The reduction thereby takes place only if and as long as this is actually needed for the maintenance of the available electric power supply.

Alternatively, the consumption monitoring unit 46 interrupts the supply of electric power to all electrical consumers 20, 22, 24, 26, 28 of a specific supply priority. This is done by switching off the pertinent electrical consumer 20, 22, 24, 26, 28. To this end, the consumption monitoring unit 46 sends, via the ISOBUS interface 48, a switching off command to a control unit 50, 52, individually assigned to the electrical consumer 20, 22, 24, 26, 28.

A reduction of the electric power supply does not take place in the case of the electrical consumer 18 since it belongs to the consumer group of the first supply priority and thus to safety-relevant vehicle core functions whose operation has to be maintained under all circumstances.

In addition, the consumption monitoring unit 46 undertakes a dynamic adaptation of the supply priorities as a function of a changing cooling demand of a vehicle unit 54 that is cooled by means of the electrical consumer 28. The electrical consumer 28 is, for example, a cooling circuit that is operated by means of an electrical cooling agent pump 56 for the cooling of the electrical consumer 26 that is comprised by the vehicle unit 54. The latter is designed as an electrical drive motor 58 and is a component of the electrical drive 38 of the agricultural attached device 14.

A temperature sensor 60 detects the cooling demand of the electrical drive motor 58. The consumption monitoring unit 46 derives a corresponding actual temperature value $T_{actual}$ from the sensor signals made available by the temperature sensor 60. The actual temperature value $T_{actual}$ is compared by the consumption monitoring device 46 to several pre-specified or predefined temperature threshold values $T_{max1}$, $T_{max2}$, $T_{max3}$ that correspond to various escalation stages of an increasing cooling deficit of the electrical drive motor 58. The supply priority of the electrical drive motor 58 is increased step by step when the temperature threshold values $T_{max1}$, $T_{max2}$, $T_{max3}$ are exceeded. In this embodiment, this takes place according to the following scheme:

1. Escalation stage: $T_{actual} > T_{max1}$, then Prio 5→Prio 4
2. Escalation stage: $T_{actual} > T_{max2}$, then Prio 4→Prio 3
3. Escalation stage: $T_{actual} > T_{max3}$, then Prio 3→Prio 2

In order to maintain the total available electric power supply, the consumption monitoring device 46 simultaneously undertakes a reduction of the total electric power demand by ranking the supply priorities of one or more of the other electrical consumers 20, 22, 24, 26.

As a result, an insufficient cooling of the electrical drive motor 58 can be promptly detected and, by an increase of the supply priority of the electrical cooling agent pump 56, can be compensated for. The electrical drive motor 58 shown in the FIGURE is thereby shown as one example. In other embodiments, it can also be an arbitrarily different vehicle unit 54 that is cooled by using electrical devices such as an electrically operated fan or cooling circuit.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An energy management system for an agricultural vehicle arrangement, comprising:
   an electric power supply unit for the supply of a large number of electrical consumers with electric power; and
   a consumption monitoring unit for the determination of a total electric power demand dependent on an actual operating state of the electrical consumers;
   wherein the consumption monitoring unit operably estimates the electric power supply that is available from the electric power supply unit and compares it to the determined total electric power demand in order to reduce the electric power supply to the electrical consumers as a function of assigned supply priorities when the available electric power supply is exceeded by the determined total energy demand;

further wherein, in response to an actual temperature related to the vehicle exceeding a threshold temperature, the consumption monitoring unit (1) increases the assigned supply priority of a cooling component that is one of the electrical consumers and (2) decreases the assigned supply priority of one or more other electrical consumers.

2. The energy supply system of claim 1, wherein the consumption monitoring unit proportionally reduces the supply of electric power to all electrical consumers with a specific supply priority to their electric rated output.

3. The energy supply system of claim 1, wherein the consumption monitoring unit interrupts the supply of electric power to all electrical consumers of a specific supply priority.

4. The energy supply system of claim 1, wherein a reduction of the supply of electric power is not executed by electrical consumers with the highest supply priority.

5. The energy supply system of claim 1, wherein a reduction of the supply of electric power is carried out only if it is necessary for the maintenance of the available electric power supply.

6. An agricultural vehicle arrangement, comprising an energy management system including an electric power supply unit and a consumption monitoring unit, the electrical supply unit configured to supply a large number of electrical consumers with electric power, and the consumption monitoring unit configured to determine a total electric power demand dependent on an actual operating state of the electrical consumers;
  wherein the consumption monitoring unit operably estimates the electric power supply that is available from the electric power supply unit and compares it to the determined total electric power demand in order to reduce the electric power supply to the electrical consumers as a function of assigned supply priorities when the available electric power supply is exceeded by the determined total energy demand;
  further wherein, in response to an actual temperature related to the vehicle exceeding a threshold temperature, the consumption monitoring unit (1) increases the assigned supply priority of a cooling component that is one of the electrical consumers and (2) decreases the assigned supply priority of one or more other electrical consumers.

7. The energy supply system of claim 6, wherein the consumption monitoring unit proportionally reduces the supply of electric power to all electrical consumers with a specific supply priority to their electric rated output.

8. The energy supply system of claim 6, wherein the consumption monitoring unit interrupts the supply of electric power to all electrical consumers of a specific supply priority.

9. The energy supply system of claim 6, wherein a reduction of the supply of electric power is not executed by electrical consumers with the highest supply priority.

10. The energy supply system of claim 6, wherein a reduction of the supply of electric power is carried out only if it is necessary for the maintenance of the available electric power supply.

11. The energy supply system of claim 1, wherein the threshold temperature is a first threshold temperature, further wherein in response to the actual temperature exceeding a second threshold temperature that is higher than the first threshold temperature, the consumption monitoring unit dynamically increases the assigned supply priority of the cooling component a second time.

12. The energy supply system of claim 11, wherein in response to the actual temperature exceeding the second threshold temperature, the consumption monitoring unit decreases the assigned supply priority of one or more of the other electrical consumers a second time.

13. The energy supply system of claim 12, wherein in response to the actual temperature exceeding a third threshold temperature that is higher than the second threshold temperature, the consumption monitoring unit dynamically increases the assigned supply priority of the cooling component a third time.

14. The energy supply system of claim 13, wherein in response to the actual temperature exceeding the third threshold temperature, the consumption monitoring unit decreases the assigned supply priority of one or more of the other electrical consumers a third time.

* * * * *